United States Patent Office 3,458,631
Patented July 29, 1969

3,458,631
METHODS OF TREATING COCCIDIOSIS WITH
4 - SULFONILAMIDO - 2,6 DIMETHOXY-
PYRIMIDINE
Jacob Bauernfeind, Glen Rock, and Milan Mitrovic,
Nutley, N.J., assignors to Hoffmann-La Roche Inc.,
Nutley, N.J., a corporation of New Jersey
No Drawing. Filed Dec. 27, 1963, Ser. No. 334,002
Int. Cl. A61k 27/00
U.S. Cl. 424—229                14 Claims

ABSTRACT OF THE DISCLOSURE

Composition for treating animal diseases, e.g. coccidiosis caused by protozoa parasites comprising essentially 4-sulfanilamido-2,6-dimethoxy-pyrimidine and methods for utilizing the foregoing composition.

---

This invention relates to a novel composition for use in veterinary medicine. More particularly, the invention relates to a novel composition useful in the prophylaxis and the therapy of animal diseases caused by parasites and to a method for the prevention and/or therapy of such diseases utilizing such composition.

In one aspect, the invention relates to a novel composition useful in the treatment of animal diseases caused by protozoa parasites and especially coccidiosis, e.g. coccidiosis of a type which infects poultry and to methods for utilizing such composition.

Coccidiosis is a disease caused by a protozoa parasite of microscopic size called coccidia, belonging to the genus Eimeria. It is specific to the host animal. Thus, the finding that a cocccidiostatic agent is suitable for use against one species of Eimeria in a host of a specific species does not necessarily carry with it the implication that it will be equally effective against other species of Eimeria in other species of hosts. In fact, many coccidiostatic agents, while being effective against a specific species of Eimeria in a host animal, will not evidence this efficaciousness against other species of Eimeria in the same host animal.

Coccidiosis affects most animals raised commercially for food purposes, e.g. poultry such as turkeys, ducks, chickens and the like, sheep, cattle, swine, etc. For example, in the poultry industry, no problems are more serious and more common than those resulting from parasitic diseases such as coccidiosis. The problem is especially great in this industry since the new techniques for raising poultry require that the birds be confined to narrow environs and, thus, be raised under crowded conditions. This close proximity of the birds while being raised is conducive to coccidiosis infection and the rapid spread thereof.

Infection is caused by the invasion of the animals by the said protozoa parasite, coccidia. The infection in the host animals is initiated by the ingestion usually along with feed or water intake of such Eimeria organisms in the sporulated oocyst stage. When the ingested oocysts enter the intestine, the infectious stage of the Eimeria soon develops from the oocysts and causes extensive damage to the inner walls of the intestine and the cecum or "intestinal pouch."

There are both chronic and acute forms of coccidiosis infection in chickens. One type called cecal coccidiosis is caused primarily by the organism E. tenella and results in the destruction of the cecal linings of the host. Intestinal coccidiosis in chickens results primarily from other species of Eimeria and is equally as serious from an economical point of view. Such species of Eimeria are exemplified by E. necatrix, E. acervulina, E. maxima, E. brunetti, E. hagani, E. praecox, E. mitis, etc. Other organisms such as E. gallopavonis, E. meleagrimitis, E. adenoeides, E. meleagridis, E. dispersa, E. innocua, E. subrotunda, etc. cause coccidiosis infections in turkeys. In the duck and goose, E. truncata, E. anseris, etc.; in cattle, E. bovis, E. zurnii, E. alabamensis, E. auburnensis, etc.; in sheep, E. ahsata, E. parva, E. faurei, E. arloingi, etc.; in pigs, E. debliecki, E. spinosa, etc., cause coccidiosis. Thus, it is apparent from the above that the various species of Eimeria cause infection to a type specific to host animals.

In poultry, e.g. chickens and turkeys, in an outbreak of coccidiosis, the flock becomes seriously infected with little or no forewarning and a very high mortality can result unless the birds are promptly treated. Animals that do survive these types of infections are usually of lessened economical value inasmuch as they are quite inefficient in converting feed to weight gains, grow much more slowly than normal animals and frequently appear listless.

As is noted above, coccidiosis is, additionally, a disease problem in other larger animals such as lambs, sheep, calves, cattle and pigs, although of less concern that it is in the poultry industry. However, an awareness is currently developing in connection with the raising of these animals of the effect of coccidiosis thereon from an economical point of view, and the concerned people in the field are beginning to recognize that the problems resulting from an outbreak of coccidiosis should not be overlooked. In such an outbreak in larger animals, the herd also becomes seriously infected with little or no forewarning. It is readily apparent that even a low mortality rate in a herd of larger animals from coccidiosis has serious economic consequences due to the large loss incurred per animal unit.

A number of coccidiostatic agents are presently available for either the therapy or prevention of coccidiosis and some of these agents are effective in preventing high mortality among the infected animals. Still, outbreaks of coccidiosis among the animals occur due, in some cases, to the development of resistance of the Eimeria to known coccodiostats. Furthermore, animals treated with certain known coccidiostats sometimes show a lower feed efficiency and less rapid weight gains than healthy animals. Moreover, many of the known coccidiostats have been found to possess a limited anticoccidial species spectrum and they are also often too expensive for wide use such as in poultry husbandry, particularly in view of the high concentration levels at which they must be used in order to achieve the desired end.

Therefore, a definite need exists for an antiparasitic composition which is effective in the treatment and control of coccidiosis caused by a broad spectrum of Eimeria organisms in animals but which does not suffer from the defect of lowering the feed efficiency and growth. Furthermore, greatly desired from the animal raisers point of view is a highly effective coccidiostat which is well tolerated by the hosts.

It is the object of the present invention to provide improved antiparasitic compositions effective in the prevention and therapy of coccidiosis but which does not significantly lower the feed efficiency and the rate of growth.

A further object of the invention is to provide a coccidiostatic agent which is effective against a broad range of organisms which cause coccidiosis in animals and is well tolerated by the host animals. Other objects of this invention will be apparent to those skilled in the art from the description which follows.

In achieving the objects of the present invention it has been discovered that compositions including 4-sulfanilamido-2,6-dimethoxy-pyrimidine per se as well as its salts, particularly those that are water soluble, are highly efficacious in the therapy and prevention of animal coccidiosis caused by a broad spectrum of coccidiosis-causing organisms, particularly those which cause coccidiosis in chickens and turkeys.

The present invention therefore is directed to a method of treating coccidiosis in animals, advantageously poultry, especially turkeys and chickens, by introducing into the gastrointestinal tract of the animal infected with a causative pathogenic agent of the disease, a therapeutic amount of 4-sulfanilamido - 2,6 - dimethoxy-pyrimidine or a salt thereof. Furthermore, the present invention is directed to a method for avoiding the development of coccidiosis in animals, especially poultry, which involves introducing 4-sulfanilamido-2,6-dimethoxy-pyrimidine or a salt thereof into the gastrointestinal tract of the animal prior to infection.

The novel antiparasitic composition of the present invention comprises a compound selected from the group consisting of 4-sulfanilamido-2,6-dimethoxy-pyrimidine and its pharmaceutically acceptable salts as the active ingredient, and an inert ingredient. The inert ingredient can comprise a feed stuff, drinking water, extender materials and the like. By the term "inert ingredient" is meant a material which does not function as an antiparasitic agent, e.g. a coccidiostatic agent, and thus, such inert material is one which is inactive for the purpose of the present invention.

Preferably, when used in conjunction with the animals' feed supply, the improved antiparasitic composition suitable for use against coccidiosis caused by most forms of organisms, especially those which cause coccidiosis in poultry, comprises an animal feed having dispersed therein, per 100 parts by weight thereof, from about 0.001 parts to about 1.0 part by weight of the said active ingredient, namely, 4-sulfanilamido-2,6-dimethoxy-pyrimidine, or pharmaceutically acceptable salts thereof. Higher amounts than 1 percent, while being efficacious, do not generally show improved results over the 1 percent employed. Thus, it is not advantageous to use amounts greater than 1 part of active ingredient per 100 parts of the said antiparasitic feed composition. In a preferred aspect, the novel antiparasitic composition useful in the control of coccidiosis comprises a poultry feed having dispersed therein per 100 parts by weight thereof, from about 0.006 to about 0.2 part of the active ingredient.

When the active ingredient is to be added to the drinking supply of the animal to be treated, it is generally employed per liter of the drinking supply, in the range of from about 0.01 to about 10 grams, more preferably in the range of from about 0.03 to about 1.0 gram. As is evident from the above, the active ingredient can be administered to the animals along with the feed and/or the drinking supply available thereto.

As noted above, the active ingredient may be 4-sulfanilamido-2,6-dimethoxy-pyrimidine or a pharmaceutically acceptable salt thereof. Among such salts may be included inorganic salts, e.g. alkali metal salts, such as sodium and potassium salts and alkaline earth metal salts such as calcium and barium salts and the like and organic salts and the like. The salts can be readily prepared from 4-sulfanilamido-2,6-dimethoxy - pyrimidine according to usual techniques. Especially preferred are the alkali metal salts since their solubility in water renders them eminently well suited for use in the preparation of liquid dispersions. However, any salt which is soluble in water and is pharmaceutically acceptable is suitable for the purposes of the present invention.

The inert ingredient of the antiparasitic agent of the present invention, as is evident from the above, may be either in liquid or in solid form, or may comprise a combination of both forms. Liquid dispersions can be prepared by using water or vegetable oil, preferably including a surface active agent, emulsifying agents and the like in the liquid dispersion, such as, ethylene diamine tetraacetic acid, etc. and solubilizers. Any suitable carrier or extender material can function as the inert ingredient in the solid form of the antiparasitic agent provided that it be inert to the active material and be nontoxic insofar as the animal to which it is to be administered is concerned. Solid materials which satisfy such requirements and thus which will function efficaciously for the purposes of the present invention are myriad. Representative of such are mineral sources such as ground oyster shells, edible cereal, vegetable, marine or animal materials such as is present in commercial animal feeds, corn meal, citrus meal, soy bean meal, fish meal, meat scraps, bentonite, dried fermentation residues and the like.

The active ingredients may be blended into a mash, pellet, or any desired configuration with the inert carrier or extender solid material by any convenient technique. For example, the composition can be formed by finely grinding or pulverizing the active ingredient and the inert ingredient using any commercially available grinder or pulverizer, with or without the feed material being present. If the feed material is not present when the grinding or pulverizing is effected, the resultant material can be distributed in accordance with the present invention in any conveniently available feed material.

For the sake of convenience and in order to insure proper distribution of the antiparasitic agent into the drinking water available to the animal or in their food supply, it has been found desirable to initially prepare a premix containing the active material, that is, a composition containing the active ingredient in concentrations much higher than those normally used for the intended purpose. The premix is a convenient manner of supplying the composition to the feed manufacturer and animal raiser who then mixes suitable amounts of the premix with the available supply of animal feed. Such premix ingredients as ground feed components, minerals, etc., with or without other nutrients, are preferably used as the carrier for the premix. When the premix is to be added to the drinking supply of the animals to be treated, it is provided in liquid form. The liquid form of the premix is prepared by adding 4-sulfanilamido-2,6-dimethoxy-pyrimidine or its salt to water advantageously in the presence of surface active agents, emulsifying agents and the like, e.g. ethylene diamine tetraacetic acid, solubilizers, etc. which are pharmaceutically acceptable to the animal species to be treated.

As is evident from the above, the feed and water compositions are intended for oral ingestion. They can be added to the normal feed supply of the treated animal or can be incorporated into the drinking supply thereof. It is also possible to administer the active ingredient by other procedures such as incorporating the same in a tablet, pill or bolus, and supplying it forcibly to the animal or providing the active ingredient in a parenterally acceptable form. Administrations of the active ingredient must be considered in terms of the specific animal under the husbandry practices encountered.

The invention is further illustrated by the following examples which are not to be construed as imposing any limitation on the scope thereof. On the contrary, it is to be clearly understood that resort may be made to various other embodiment modifications and equivalents thereof which would readily suggest themselves to those skilled in the art without departing from the spirit of the present invention and/or the scope of the intended claims.

EXAMPLE 1

Ninety-nine groups of 10 Broad-Breasted White turkey poults, 2 weeks old, were fed a practical turkey starter having the following composition.

| Ingredient: | Parts by weight |
|---|---|
| Ground yellow corn | 33.00 |
| Soybean oil meal (44 percent protein) | 50.00 |
| Animal fat (stabilized) | 5.00 |
| Steamed bonemeal | 2.50 |
| Limestone | 1.00 |
| Alfalfa meal (17 percent protein) | 2.00 |
| Dried whey | 2.50 |
| Fish solubles | 2.50 |
| Manganese sulfate (feed grade) | 0.05 |
| Iodized salt | 0.50 |
| Methionine (98 percent) | 0.15 |
| Choline (25 percent) | 0.25 |
| Vitamin $B_{12}$ (20 mg./lb.) | 0.0125 |
| Vitamin supplement: 2 gm. riboflavin, 4 gm. pantothenic acid and 9 gm. niacin per pound | 0.10 |
| Dry vitamin $D_3$ (3000 units/gm.) | 0.011 |
| Dry vitamin A (10,000 units/gm.) | 0.05 |

The compound, 4-sulfanilamido-2,6-dimethoxy-pyrimidine, is mixed with parts of this diet to provide compositions having 0.05, 0.025, 0.0125, and 0.006 part by weight per 100 parts of composition of the active component respectively. The turkey poults were fed ad libitum. Three days later the poults were exposed to virulent cultures of *E. gallopavonis, E. meleagrimitis* and *E. adenoeides* either alone or combined in amounts of 100,000 to 1,000,000 sporulated oocysts per bird. A similar group of poults of identical number were fed the conventional diet alone and infected as aforesaid for control purposes. It was observed that 4-sulfanilamido-2,6-dimethoxy-pyrimidine prevented mortality and/or reduced morbidity from these organisms in turkeys without any effect on normal growth and feed consumption.

Furtheremore, it was shown that the medicated infected birds withstood the challenge against species homologous to those previously used. Accordingly, the coccidiostatic agent herein discussed permits the treated turkey poults to develop immunity from further attacks of coccidiosis.

EXAMPLE 2

A similar procedure as set out in Example 1 was carried out except that the sodium salt of 4-sulfanilamido-2,6-dimethoxy-pyrimidine was added to the water of the turkey poults 3 days following infection to provide an amount of 0.5, 0.25, 0.125 and 0.0625 g. therein per liter of the drinking supply. The results obtained indicate that the coccidial infection was efficiently controlled by employing the active ingredient at these concentration levels in the animals' drinking supply. Non-medicated infected turkeys succumbed or became morbid.

EXAMPLE 3

2,000 Peterson Cross broiler-type chicks, 2 weeks old, coccidia free, are kept in closed batteries under constant room temperature of 80° F. and fed freely a diet having the following composition.

| Ingredient: | Parts by weight |
|---|---|
| Ground yellow corn | 30.07 |
| Ground heavy oats | 4.93 |
| Wheat standard middlings | 4.92 |
| Alfalfa meal | 4.92 |
| Meat scrap, 50 percent protein | 7.40 |
| Soybean meal | 29.58 |
| Fish meal | 7.40 |
| Dried skim milk | 4.92 |
| Dried yeast | 2.46 |
| Ground limestone | 1.47 |
| Steamed bone meal | 0.98 |
| Iodized salt | 0.34 |
| Choline chloride | 0.25 |
| Manganese sulfate | 0.024 |
| D-activated sterol | 0.05 |
| Vitamin A and D oils | 0.15 |

4-sulfanilamido-2,6-dimethoxy-pyrimidine is mixed with parts of this diet to provide compositions having per 100 parts by weight 0.10, 0.05, 0.025 and 0.0125 parts by weight of the active component respectively. All of the chicks were allowed feed and water ad libitum. Two days later all of the chicks were infected with cultures of *E. tenella, E. necatrix, E. acervulina, E. maxima* and *E. brunetti*, either alone or combined. The birds were given from 50,000 to 200,000 sporulated oocysts per bird. The efficacy of the compound tested was evaluated upon the prevention and/or significant reduction in mortality as well as presence or absence of gross pathological lesions of the medicated infected versus the infected unmedicated groups. It was shown that 4-sulfanilamido-2,6-dimethoxy-pyrimidine effectively prevents and/or reduces mortality and morbidity and permits normal growth in chicks affected with the organisms specified above.

EXAMPLE 4

A similar procedure as set out in Example 3 was carried out except that the sodium salt of 4-sulfanilamido-2,6-dimethoxy-pyrimidine was added to the drinking water of 2 week old broiler-type chicks, three days after exposure, whereby to provide an amount of 1.0, 0.5, 0.25 and 0.125 g. per liter of the said sodium salt therein. The results obtained indicate that the coccidial infection is efficiently controlled employing the active ingredient at these concentration levels in the animals' drinking supply.

EXAMPLE 5

The following ingredients are combined and thoroughly blended to provide a feed premix concentrate suitable for use in feed in the prophylaxis and the therapy of coccidiosis.

| | G. |
|---|---|
| 4-sulfanilamido-2,6-dimethoxy-pyrimidine | 114 |
| Finely divided dry soybean | 340 |

The premix concentrate, which contains 25 percent active drug, is combined with any conveniently available ration such as set out in Example 1 to provide a feeding level of 0.25 part by weight of 4-sulfanilamido-2,6-dimethoxy-pyrimidine per 100 parts of the final medicated ration.

EXAMPLE 6

The following ingredients can be combined to provide a liquid premix concentrate suitable for addition to an animal's driking supply.

| | G. |
|---|---|
| Sodium salt of 4-sulfanilamido-2,6-dimethoxy-pyrimidine | 138 |
| Water to 1000 ml., q.s. | |

The liquid premix, 12.5 percent active drug, may be added to water to provide 0.25 g. per liter of the sodium salt of 4-sulfanilamido-2,6-dimethoxy-pyrimidine therein.

EXAMPLE 7

Several groups of Peterson Cross and White Leghorn birds, day old, were exposed with *E. tenella, E. necatrix, E. maxima, E. acervulina* and *E. brunetti* coccidia cultures by oral administration. Sodium salt of 4-sulfanilamido-2,6-dimethoxy-pyrimidine was added to the drinking water of each group 24-48 hours post innoculation, whereby the provide an amount of 0.5, 0.25 and 0.125 g. per liter of the said drug therein. The medicated water at said levels was administered for a period of six consecutive days. A representative group of birds were challenged, after medication was discontinued, with homologous species of the coccidia previously used. The results obtained indicate that the birds were resistant to challenge and hence, have developed an immunity to these species of coccidia.

EXAMPLE 8

Fifty head of beef cattle showing clinical symptoms of coccidiosis (unthrifty appearance; profuse hemorrhagic diarrhea containing oocysts of bovine coccidia—*E. zurnii* and *E. bovis*) were treated therepeutically by adding the premix of Example 6 to their drinking supply to provide 1.0 g. of the active drug therein per liter. The animal would thus ingest about 25 mg. of drug per lb. of body weight thereof.

All treated animals recovered. Fecal examination for oocysts carried out at the end of the experiment proved to be negative.

EXAMPLE 9

A flock of 75 sheep (ewes, rams and lambs) with clinical symptoms of coccidiosis (weakness; watery and hemorrhagic feces containing oocysts of ovine coccidiosis—*E. arloingi*) were treated therapeutically by adding the premix of Example 6 to their drinking supply to provide 25 mg. of the active drug per pound of body weight of the animal.

All treated animals recovered.

EXAMPLE 10

A group of 30 swine showing clinical signs of coccidiosis (diarrhea, anorexia, presence of oocysts—*E. suis*—in the feces) were treated therapeutically by adding the premix of Example 6 to their drinking water to provide 25 mg. of the active drug per pound of body weight of the animal.

All treated animals recovered.

We claim:

1. A method of combating coccidiosis in an animal which comprises orally administering to the said animal an animal feed composition containing a compound selected from the group consisting of 4-sulfanilamido-2,6-dimethoxy-pyrimidine and pharmaceutically acceptable salts thereof in an amount of from about 0.001 part to about 1.0 part by weight per 100 parts by weight of the animal feed composition.

2. A method according to claim 1 wherein the compound is 4-sulfanilamido-2,6-dimethoxy-pyrimidine.

3. A method as in claim 1 wherein the compound is administered before any infection, whereby it serves as a preventive agent.

4. A method as in claim 1 wherein the compound is administered after infection, whereby it serves as a therapeutic agent.

5. A method of combating coccidiosis in an animal which comprises orally administering to the said animal an animal feed composition containing a compound selected from the group consisting of 4-sulfanilamido-2,6-dimethoxy-pyrimidine and pharmaceutically acceptable salts thereof in an amount of from about 0.006 part to about 0.2 part per 100 parts of the animal feed composition.

6. A method of combating coccidiosis in an animal which comprises orally administering to the said animal an aqueous medium containing per liter, from about 0.01 to about 10 g. of a compound selected from the group consisting of 4 - sulfanilamido-2,6-dimethoxy-pyrimidine and pharmaceutically acceptable salts thereof.

7. A method as defined in claim 6 wherein the sodium salt of 4-sulfanilamido-2,6-dimethoxy-pyrimidine is employed.

8. A method as in claim 6 wherein the compound is administered before infection, whereby it serves as a preventive agent.

9. A method as in claim 6 wherein the compound is administered after infection, whereby it serves as a therapeutic agent.

10. A method of combating coccidosis in animals which comprises orally administering to the said animals a compound selected from the group consisting of 4-sulfanilamido-2,6-dimethoxy-pyrimidine and pharmaceutically acceptable salts thereof in an amount of from about 0.03 to about 1.0 g., per liter, of water ingested.

11. A method as in claim 10 wherein the parasitic infection is coccidiosis in poultry.

12. A method as in claim 10 wherein the parasitic infection is coccidiosis in cattle.

13. A method of combating coccidiosis in poultry which comprises orally administering to the said poultry a compound selected from the group consisting of 4-sulfanilamido-2,6-dimethoxy-pyrimidine and pharmaceutically acceptable salts thereof in an amount of from about 0.001 part to about 1.0 part per 100 parts by weight of the feed consumed by the poultry.

14. A method of combating coccidiosis in cattle which comprises orally administering to the said cattle a compound selected from the group consisting of 4-sulfanilamido-2,6-dimethoxy-pyrimidine and pharmaceutically acceptable salts thereof in an amount of from about 0.001 part to about 1.0 part per 100 parts by weight of the feed consumed by the cattle.

References Cited

Chem. Abst. Subject Index—6th Collective Index—1957 to 1961, p. 11271S.

Tsunda—Vet. Bull., vol. 34, 1964, p. 139.

FRANK CACCIAPAGLIA, JR., Primary Examiner

H. ELLIS, Assistant Examiner